United States Patent [19]

Kawaguchi et al.

[11] Patent Number: 4,664,711

[45] Date of Patent: May 12, 1987

[54] INK FOR MARKING PEN

[75] Inventors: Keizo Kawaguchi; Takafusa Ando, both of Aichi, Japan

[73] Assignee: Pilot Ink Co., Ltd., Japan

[21] Appl. No.: 771,475

[22] Filed: Sep. 3, 1985

Related U.S. Application Data

[63] Continuation of Ser. No. 561,711, Dec. 15, 1983, abandoned.

[30] Foreign Application Priority Data

Dec. 18, 1982 [JP] Japan ................... 57-222699

[51] Int. Cl.$^4$ ............... C09D 11/08; C09D 11/10; C09D 11/14
[52] U.S. Cl. ........................... 106/23; 106/22; 106/26; 106/27; 106/29; 106/30; 106/300; 106/308 F; 106/308 M
[58] Field of Search ............ 106/22, 23, 26, 29, 106/300, 30, 308 F, 27, 308 M; 523/164

[56] References Cited

U.S. PATENT DOCUMENTS

| | | | |
|---|---|---|---|
| 2,232,723 | 2/1941 | Patterson | 106/300 |
| 3,617,323 | 11/1971 | Riegler | 106/308 F |
| 3,642,510 | 2/1972 | Sugiyama | 106/300 |
| 4,370,171 | 1/1983 | Robinson et al. | 106/300 |
| 4,386,171 | 5/1983 | Graham et al. | 523/337 |

Primary Examiner—Amelia B. Yarbrough
Attorney, Agent, or Firm—Sughrue, Mion, Zinn, Macpeak and Seas

[57] ABSTRACT

A marking ink for use in marking pens is described, comprising 5 to 40% by weight of titanium dioxide surface treated with an alkaline earth metal or aluminum salt of a fatty acid having from 6 to 22 carbon atoms, 3 to 20% by weight of a resin, and a remainder of an organic solvent capable of dissolving therein the resin. The marking ink may further contain 0.5 to 30% by weight of a colorant. In this marking ink, precipitation and separation of titanium dioxide is controlled, and even if such precipitation and separation occur, titanium dioxide can be easily re-dispersed in the ink.

14 Claims, No Drawings

INK FOR MARKING PEN

This is a continuation of application Ser. No. 561,711, filed 12/15/83, now abandoned.

FIELD OF THE INVENTION

The present invention relates to a marking ink or ink for marking pens comprising titanium dioxide or a mixture of titanium dioxide and other colorants dispersed in a vehicle, which can be used to produce opaque colored marks, e.g., on paper. More particularly, the present invention relates to an improved marking ink in which precipitation and separation of titanium dioxide are controlled and titanium dioxide which has been precipitated can be easily re-dispersed.

BACKGROUND OF THE INVENTION

A marking ink comprising titanium dioxide or a mixture of titanium dioxide and other colorants dispersed in a vehicle has been used in marking pens. These marking pens are generally designed so that the marking ink is supplied from an ink reservoir in the casing thereof through a valve mechanism to a writing member such as a bundle of fibers or a hollow plastic bar. Hence, it is necessary for the marking ink to have a very low viscosity of about 1/10,000 to 1/50 that of a conventional ink, i.e., 50 centipoises (cps) or less at room temperature, so that it can smoothly flow out of the writing member. Titanium dioxide, however, which has a very high specific gravity compared with organic components present, is very difficult to disperse stably in a vehicle of such low viscosity. That is, the precipitation and separation of titanium dioxide in the marking ink inevitably occurs in a relatively short period of time after the preparation thereof.

In the marking pen as described above, a hard ball with a diameter of about 5 to 10 mm is placed in the ink reservoir. When used, the marking pen is shaked and the marking ink is stirred by the action of the hard ball to re-disperse the titanium dioxide. This overcomes the above problem of precipitation and separation of titanium dioxide to a certain extent. If, however, the marking pen is allowed to stand for a long period of time without being used, caking of precipitated titanium dioxide occurs and the hard ball sinks in the titanium dioxide cake. Thus, for re-dispersion of the titanium dioxide it is necessary to shake the marking pen very vigorously. If the marking pen has been used, the action of the hard ball does not extend to the marking ink which has entered the writing member through the valve mechanism from the ink reservoir and has remained therein. Thus, if the marking pen is allowed to stand after being used, titanium dioxide precipitates in and separates from the marking ink, and blocks the capillary channel through which the marking ink flows, causing the phenomenon of inking failure on re-use.

SUMMARY OF THE INVENTION

An object of the invention is to provide a marking ink containing titanium dioxide as a colorant, which is free of the defects described above.

It has been found that the above object is attained by using titanium dioxide surface treated with an alkaline earth metal or aluminum salt of a fatty acid containing from 6 to 22 carbon atoms.

The present invention relates to a marking ink for marking pens coprising 5 to 40% by weight of titanium dioxide surface treated with an alkaline earth metal or aluminum salt of a fatty acid having from 6 to 22 carbon atoms, 3 to 20% by weight of a resin, and a remainder of a volatile organic solvent dissolving said resin.

DETAILED DESCRIPTION OF THE INVENTION

The titanium dioxide as used herein may be either of the rutile type or of anatase type. Titanium dioxide of the rutile type is preferred from the viewpoint of covering power.

The surface of the titanium dioxide particles is inherently hydrophilic. Thus, when such titanium particles are used in non-aqueous solvent-base inks, they are usually surface treated with oleophilic resins or polymers. This surface treatment, however, does not overcome the problem described above.

According to the present invention, it has been found that titanium dioxide surface treated with an alkaline earth metal (e.g., magnesium, calcium, zinc, strontium and barium) or an aluminum salt of a fatty acid containing from 6 to 22 carbon atoms is most suitable for use in marking inks.

In preparing the surface treated titanium dioxide as described above, titanium dioxide having a particle size distribution range of from 0.05 to 0.5 $\mu$m, preferably from 0.15 to 0.4 $\mu$m, is used from the viewpoint of covering power.

Surface treatment of such titanium dioxide is performed as follows:

Titanium dioxide is suspended in an aqueous solution of an alkali metal or ammonium salt of a fatty acid containing from 6 to 22 carbon atoms (such as sodium, potassium or ammonium salt of caproic acid, caprylic acid, capric acid, lauric acid, myristic acid, palmitic acid, stearic acid, arachic acid, behenic acid, undecylenic acid, oleic acid, elaidic acid, erucic acid or linoleic acid) and, thereafter, an aqueous solution of a water-soluble alkaline earth metal or aluminum salt (such as magnesium chloride, calcium chloride, strontium chloride, barium chloride, zinc chloride, magnesium nitrate, calcium nitrate, strontium nitrate, barium nitrate, zinc nitrate, magnesium sulfate, zinc sulfate and aluminum sulfate) is added. The resulting mixture is stirred, and the thus formed precipitate is filtered off, washed with water, and dried. On pulverization of the precipitate, there is obtained the desired surface treated titanium dioxide.

The structure of the surface treated titanium dioxide particle as prepared above is considered to be such that the carboxyl group of the fatty acid is chemical adsorbed on the titanium dioxide particle surface with its fatty chain extended outward and, furthermore, the fatty acid metal salt (alkaline earth metal or aluminum salt of fatty acid) is adsorbed around the fatty chain layer in the form of double layers in such a manner that the metal-carboxylate portion is extended outward. The thickness of the adsorbed layer is several to several hundred angstroms. This structure makes the titanium dioxide particle surface oleophilic. Thus, it is assumed that the dispersion stability of the titanium dioxide particles in the ink vehicle and easy re-dispersion of the precipitated titanium dioxide particles are brought about by a combination of the above described formation of an oleophilic surface, a reduction in the relative specific gravity of the particles, an increase in the repulsion between particles in the marking ink, and so forth.

The above described effect cannot be obtained if fatty acids are used whose carbon atom number is less than 6 or more than 22.

In the marking ink of the invention, the surface treated titanium dioxide constitutes 5 to 40% by weight, preferably 10 to 35% by weight, of the ink composition.

Colorants which may be used in the marking ink of the invention include organic pigments such as insoluble azo pigments (e.g., Permanent Red FRLL (C.I. No. 12460), Hansa Yellow 10G (C.I. No. 11710), and Benzidine Yellow (C.I. No. 21090)), phthalocyanine pigments (e.g., Copper Phthalocyanine (C.I. No. 74160), and Phthalocyanine Green (C.I. No. 74260)), thioindigo pigments (e.g., Thioindigo Red B (C.I. No. 73300) and Thioindigo Bordeaux (C.I. No. 73312)), threne pigments (e.g., Monolite Fast Red YS (C.I. No. 59300) and Indanthrene Blue (C.I. No. 69835)) and quinacridone pigments (e.g., Quinacridone Magenta (C.I. No. 73915) and Quinacridone Red (C.I. No. 46500)); fluorescent pigments of the resin solid solution type prepared using fluorescent dyes; oil-soluble type solvent dyes (e.g., C.I. Solvent Yellow 30 (C.I. No. 21240), Solvent Black 3 (C.I. No. 26150), Solvent Blue 35 (C.I. No. 61554) and Solvent Red 49 (C.I. No. 45170B)); and spirit-soluble type solvent dyes such as amine salt of acid dyes (e.g., amine salts of C.I. Nos. 22910 and 74400), complex salt of acid dyes and basic dyes (e.g., complex salt of C.I. No. 19140 and C.I. No. 45160, and complex salt of C.I. No. 16055 and C.I. No. 45170) and basic dyes (e.g., C.I. Basic Violet 10 (C.I. No. 45170)). These colorants are used within the range of from 0.5 to 30% by weight, preferably from 2 to 25% by weight, of the ink composition.

Resins which can be used in the marking ink of the invention include ketone resins (e.g., cyclohexanone-acetoaldehyde condensate and cyclohexanone-formaldehyde condensate), polyacrylate resins (e.g., polyethyl acrylate and methyl acrylate-isobutyl acrylate copolymer), polymethacrylate resins (e.g., polymethylmethacrylate, and methylmethacrylate-styrene copolymer), a maleic acid resin, esterified rosins (e.g., rosin glyceride), a phenol-formaldehyde condensate resin, aliphatic, alicyclic or aromatic hydrocarbon resins (e.g., polyisobutylene, polydicyclopentadiene, and poly α-methyl styrene), a cumarone-indene resin, natural resins (e.g., dammer and shellac), cellulose derivatives (e.g., ethyl cellulose, acetyl butyl cellulose and nitrocellulose), vinyl polymers (e.g., a vinyl chloride/vinyl acetate copolymer, a styrene/maleic acid copolymer, polyvinyl butyral, polyvinyl acetate and polyvinyl alkyl ether), and a modified alkyd resin. Part of these resins may be used as a surface treatment resin for organic pigments as colorants. The amount of the resin added is from 3 to 20% by weight, preferably from 5 to 15% by weight, of the ink composition.

Any organic solvents can be used in the invention so long as they are capable of dissolving therein the resins as used herein. Solvents having a boiling point ranging between 100° and 180° C. are preferred from the viewpoint of drying properties. For example, aromatic hydrocarbons such as toluene and xylene, esters such as butyl acetate and amyl acetate, ketones such as methyl ethyl ketone and methyl isobutyl ketone, glycol ethers such as methyl glycol and butyl glycol, glycol ether acetates, and aliphatic and alicyclic hydrocarbons can be used.

The marking ink according to the present invention has a viscosity of 50 cps or less, preferably about 10 to 50 cps, at room temperature.

The present invention is described in greater detail with reference to the following Example.

EXAMPLE

Samples of the invention and comparative samples having the formulations shown in Table 1 were prepared in the manner as described hereinafter. The performance of each ink sample is shown in Table 2. All the values in Table 1 are represented in terms of parts by weight.

PREPARATION OF SURFACE TREATED TITANIUM DIOXIDES (1) TO (4)

A 1 liter vessel was charged with 800 g of water and 2 g of a water-soluble alkali metal salt or ammonium salt of fatty acid, and the system then stirred for 10 minutes by means of a chemistirrer. Thereafter, 100 g of starting titanium dioxide (a) or (b) as shown below was gradually added thereto, and the resulting mixture was stirred at a high speed to form a titanium dioxide suspension in about 40 minutes. To this suspension was added a 10% aqueous solution of an alkaline earth metal, and the resulting mixture was subjected to high speed stirring at room temperature for about 1 hour to obtain a precipitate. This precipitate was filtered off, washed three times with 1,000 ml of water to remove by-produced soluble salts, and then dried at about 120° C. for 20 hours to obtain a cake. This cake was pulverized by means of a sand mill.

Starting titanium dioxide (a):
  Rutile type titanium dioxide (particle size: 0.2–0.3 μm)

Starting titanium dioxide (b):
  Rutile type titanium dioxide (particle size distribution: 97.8% between 0.1 and 0.3 μm)

|  | Surface Treated Titanium Dioxide | | | |
|---|---|---|---|---|
|  | (1) | (2) | (3) | (4) |
| Starting Titanium Dioxide | Titanium Dioxide (a) | Titanium Dioxide (a) | Titanium Dioxide (b) | Titanium Dioxide (b) |
| Surface Treating Agent Precursor |  |  |  |  |
| Water-Soluble Alkali Metal or Ammonium Salt of Fatty Acid | Potassium Myristate | Sodium Palmitate | Ammonium Stearate | Potassium Oleate |
| Water-Soluble Alkaline Earth Metal Salt | Zinc Chloride | Calcium Nitrate | Magnesium Sulfate | Barium Chloride |

PREPARATION OF INK USING MATERIALS PER TABLE 1

Samples 1 to 5 and Comparative Samples 1 and 2:

The surface treated titanium dioxide (1), ½ or less of the resin to be used, and ½ or less of the organic solvent to be used were placed in a vessel and mixed by stirring for about 1 hour by means of a paint shaker to prepare a white paste. This white paste was added to a vehicle which had been separately prepared using the remaining resin and organic solvent. The mixture prepared as above was stirred by means of a chemistirrer using glass beads (1 to 2 mm) in a weight amount of twice as much as the mixture and then the glass beads were removed from the system to form Sample 1.

Comparative Sample 1 was prepared in the same manner as Sample 1 except that surface untreated titanium dioxide (i.e., starting titanium dioxide (a)) was used in place of the surface treated titanium dioxide (1).

The other inks, Samples 2 to 5 and Comparative Sample 2, were prepared by gradually adding the other colorants to the ink prepared in the same manner as Sample 1 [Except that the surface treated titanium dioxide (2), (3) or (4) or the surface untreated titanium dioxide (i.e., starting titanium dioxide (b)) was used in place of the surface treated titanium dioxide (1)] while stirring and stirring the resulting mixtures for 1 hour.

Samples 6 and 7 and Comparative Sample 3:

A suitable amount of solvent was added to predetermined amounts of the organic pigment and resin, which were then fully kneaded in a kneader and then in a three-roll mill and, thereafter, vacuum dried to form the pigment surface treated with resin. A predetermined amount of the surface treated pigment was dispersed in an about ½ of the amount of solvent to be used to form a paste. The surface treated titanium dioxide (1) or (4) or the surface untreated titanium dioxide (i.e., starting titanium dioxide (a)) was added to the paste and the system fully mixed and then diluted with the remaining solvent and stirred for about 1 hour to prepare the desired ink.

TABLE 1

|  | Sample | | | | | | | Comparative Sample | | |
|---|---|---|---|---|---|---|---|---|---|---|
|  | 1 | 2 | 3 | 4 | 5 | 6 | 7 | 1 | 2 | 3 |
| Titanium Dioxide | | | | | | | | | | |
| Surface Treated Titanium Dioxide (1) | 28 | — | — | — | — | 6 | — | — | — | — |
| Surface Treated Titanium Dioxide (2) | — | 28 | — | — | 25 | — | — | — | — | — |
| Surface Treated Titanium Dioxide (3) | — | — | 28 | — | — | — | — | — | — | — |
| Surface Treated Titanium Dioxide (4) | — | — | — | 20 | — | — | 6 | — | — | — |
| Starting Titanium Dioxide (a) | — | — | — | — | — | — | — | 28 | — | 6 |
| Starting Titanium Dioxide (b) | — | — | — | — | — | — | — | — | 20 | — |
| Colorant | | | | | | | | | | |
| Yellow Solvent Dye (*1) | — | 2 | — | — | — | — | — | — | — | — |
| Blue Solvent Dye (*2) | — | — | 3 | — | — | — | — | — | — | — |
| Red Fluorescent Pigment (*3) | — | — | — | 20 | — | — | — | — | 20 | — |
| Orange-Colored Fluorescent Pigment (*4) | — | — | — | — | 25 | — | — | — | — | — |
| Red Organic Pigment (*5) | — | — | — | — | — | 15 | — | — | — | — |
| Green Organic Pigment (*6) | — | — | — | — | — | — | 14 | — | — | 14 |
| Resin | | | | | | | | | | |
| Ketone Resin (*7) | 6 | — | — | — | — | — | — | 8 | — | — |
| Maleinated Rosin (*8) | — | 7 | — | — | — | — | — | — | — | — |
| Aliphatic Hydrocarbon Resin (*9) | — | — | 7 | — | — | — | — | — | — | — |
| Methyl Methacrylate Copolymer (*10) | — | — | — | 5 | 5 | — | — | — | 5 | — |
| Vinyl Chloride/Vinyl Acetate Copolymer (*11) | — | — | — | — | — | 15 | — | — | — | — |
| Esterified Rosin (*12) | — | — | — | — | — | — | 14 | — | — | 14 |
| Solvent | | | | | | | | | | |
| Xylene | 56 | 53 | 20 | 30 | 30 | — | 51 | 54 | 30 | 51 |
| Methyl Isobutyl Ketone | — | — | — | — | — | 40 | 15 | — | — | 15 |
| Butyl Acetate | — | — | — | — | 15 | 24 | — | — | — | — |
| Methyl Glycol | 10 | 10 | 42 | 25 | — | — | — | 10 | 25 | — |

Note:
(*1): C.I. 21240
(*2): C.I. Solvent Blue 26
(*3): Solid Solution of a red dye (C.I. 45160) and a benzoguanamine-formaldehyde condensation resin
(*4): Solid solution of an orange dye (C.I. 45005) and a benzoguanamine-formaldehyde condensation resin
(*5): C.I. Pigment Red 144
(*6): C.I. 74260
(*7): Cyclohexanone/formaldehyde condensation resin (acid value: 1 or less; softening point: 85 to 100° C.)
(*8): Rosin/maleic acid condensate (acid value: 25 or less; softening point: 140–150° C.)
(*9): Softening point: 100° C.; acid value: 1 or less; iodine value: 145
(*10): Specific gravity: 1.16; glass transition point: 35° C.
(*11): Vinyl chloride/vinyl acetate (molar ratio: 75:25; average polymerization degree: about 400)
(*12): Glycerine ester of rosin (softening point: 85° C.; acid value: 6.5)

TABLE 2

|  | Reference No. | Sample | | | | | | | Comparative Sample | | |
|---|---|---|---|---|---|---|---|---|---|---|---|
|  |  | 1 | 2 | 3 | 4 | 5 | 6 | 7 | 1 | 2 | 3 |
| Initial Dispersibility | 1 | ⊚ | ⊚ | ⊚ | ⊚ | ⊚ | ⊚ | ⊚ | ⊚ | ⊚ | ○ |
| Re-dispersibility | 2 | ⊚ | ⊚ | ⊚ | ⊚ | ⊚ | ⊚ | ⊚ | x | Δ | x |
| Variation with Time of Performance in Wet Condition | | | | | | | | | | | |
| Wet Condition (1) | 3 | ⊚ | ⊚ | ⊚ | ⊚ | ⊚ | ⊚ | ⊚ | x | x | x |
| Wet Condition (2) | 4 | ⊚ | ⊚ | ⊚ | ⊚ | ⊚ | ⊚ | ⊚ | x | x | x |
| Wet Condition (3) | 5 | ⊚ | ⊚ | ⊚ | ⊚ | ⊚ | ⊚ | ⊚ | x | x | x |
| Variation with Time of Performance in Dry Condition | | | | | | | | | | | |
| Dry Condition (1) | 6 | ⊚ | ⊚ | ⊚ | ⊚ | ⊚ | ⊚ | ⊚ | Δ | Δ | Δ |
| Dry Condition (2) | 7 | ⊚ | ○ | ⊚ | ⊚ | ⊚ | ⊚ | ⊚ | Δ | Δ | Δ |

The symbols used in Table 2 are as follows:
⊚ : Very good
○ : Good
Δ: Bad
x: Very bad Reference No. 1

(1) Initial Dispersibility

A marking pen (a pen having a valve mechanism as described above) was filled with a marking ink. Using this marking pen, a letter was written on a transparent polyethylene film. The ratings were made based on the color separation and luster of the letter.

Reference No. 2

(2) Re-dispersibility

A marking pen was allowed to stand with its writing member or top portion downward for 1 month without being used. At the end of the time, the marking pen was shaken gently five times. The ratings were made based on the sound produced by the hard ball.

Reference No. 3

(3) Variation with Time of Performance in Wet Condition

Wet Condition (1)

A marking pen was shaken well and thereafter its writing member or top portion was pressed to fully fill it with marking ink. This marking pen was then allowed to stand with a cap placed on the writing member and with the writing member upward for 1 month. At the end of the time, the covering power of the marking ink was determined on a transparent glass plate.

Reference No. 4

(4) Wet Condition (2)

The writing member of a marking pen was filled with marking ink. This marking pen was allowed to stand with a cap placed on the writing member and with the writing member downward for 1 month. At the end of the time, the ease of flow of the marking ink from the writing member was examined.

Reference No. 5

(5) Wet Condition (3)

The writing member of a marking pen was filled with marking ink. This marking pen was allowed to lay for 1 month with a cap placed on the writing member. At the end of the time, a letter was written on a transparent polyethylene film using the writing pen. The ratings were made based on two color properties: the ability of the letter to separate into a transparent area and a white area.

Reference No. 6

(6) Variation with Time of Performance in Dry Condition

Dry Condition (1)

A paint marker which had not been used was allowed to stand for 1 month with its writing member upward. At the end of the time, the paint marker was gently shaken five times. Then, the writing member was pressed to allow the marking ink to flow out, and its covering power on a glass plate was examined.

Reference No. 7

(7) Dry Condition (2)

A paint marker which had not been used was allowed to stand for 1 month with its writing member downward. At the end of the time, the paint marker was gently shaken five times. Then, the ease of flow of the marking ink was examined.

As can be seen from the above described results, Ink Samples of the invention are comparable to Comparative Ink Samples containing titanium dioxide not surface treated with respect to writing performance just after preparation. When used in a marking pen, they show a great improvement over Comparative Ink Samples.

That is, the marking ink of the invention maintains its original superior properties such as ink flow ability, tone and covering power over a long period of time irrespective of the condition in which it is allowed to stand, and, furthermore, it has superior recovering properties, so that even if the separation phenomenon occurs, the original ink condition can be easily recovered by gently shaking.

While the invention has been described in detail and with reference to specific embodiments thereof, it will be apparent to one skilled in the art that various changes and modifications can be made therein without departing from the spirit and scope thereof.

What is claimed is:

1. A marking ink for a marking pen comprising (a) 5 to 40% by weight of titanium dioxide pigment surface treated with a magnesium, calcium, strontium, barium, zinc or aluminum salt of a fatty acid having from 6 to 22 carbon atoms, (b) 3 to 20% by weight of a resin, and (c) the remainder of a volatile organic solvent dissolving said resin, wherein said ink has a viscosity of 50 cps or less and wherein said surface treated titanium dioxide pigment is prepared by adding a water-soluble magnesium, calcium, strontium, barium, zinc or aluminum salt to a suspension of titanium dioxide pigment in an aqueous solution of an alkali metal salt or ammonium salt of said fatty acid to produce aggregated titanium dioxide pigment particles adsorbing a magnesium, calcium, strontium, barium, zinc or aluminum salt of said fatty acid on the individual surfaces thereof and isolating the resulting particles from said aqueous solution.

2. A marking ink for a marking pen as set forth in claim 1, wherein said marking ink additionally contains 0.5 to 30% by weight of a colorant selected from the group consisting of organic pigments, solvent dyes and fluorescent pigments.

3. A marking ink for a marking pen as set forth in claim 1, wherein said titanium dioxide is rutile type titanium dioxide or anatase type titanium dioxide.

4. A marking ink for a marking pen as set forth in claim 3, wherein said titanium dioxide is rutile type titanium dioxide.

5. A marking ink for a marking pen as set forth in claim 1, wherein said fatty acid having 6 to 22 carbon atoms is caproic acid, caprylic acid, capric acid, lauric acid, myristic acid, palmitic acid, stearic acid, arachic acid, behenic acid, undecylenic acid, oleic acid, elaidic acid, erucic acid or linoleic acid.

6. A marking ink for a marking pen as set forth in claim 1, wherein said titanium dioxide has a particle size distribution range of from 0.05 to 0.5 $\mu$m.

7. A marking ink for a marking pen as set forth in claim 1, wherein said water-soluble magnesium, calcium, strontium, barium, zinc or aluminum salt is magnesium chloride, calcium chloride, strontium chloride, barium chloride, zinc chloride, magnesium nitrate, calcium nitrate, strontium nitrate, barium nitrate, zinc nitrate, magnesium sulfate, zinc sulfate or aluminium sulfate.

8. A marking ink for a marking pen as set forth in claim 2, wherein said solvent dyes are oil-soluble type solvent dyes or spirit-soluble type solvent dyes.

9. A marking ink for a marking pen as set forth in claim 8, wherein said spirit-soluble type solvent dyes are amine salt of acid dyes, complex salts of acid dyes and basic dyes, or basic dyes.

10. A marking ink for a marking pen as set forth in claim 2, wherein said organic pigments are insoluble azo pigments, phthalocyanine pigments, thioindigo pigments, threne pigments or quinacridone pigments.

11. A marking ink for a marking pen as set forth in claim 2, wherein said fluorescent pigments are fluorescent pigments of the resin solid solution type prepared using fluorescent dyes.

12. A marking ink for a marking pen as set forth in claim 1, wherein said resin is ketone resins, polyacrylate resins, polymethacrylate resins, a maleic acid resin, esterified rosins, a phenol-formaldehyde condensate resin, aliphatic, alicyclic or aromatic hydrocarbon rsins, a cumarone-indene resin, natural resins, cellulose derivatives, vinyl polymers, or a modified alkyd resin.

13. A marking ink for a marking pen as set forth in claim 1, wherein said volatile organic solvent has a boiling point ranging between 100° and 180° C.

14. A marking ink for a marking pen as set forth in claim 1, wherein said volatile organic solvent is aromatic hydrocarbons, esters, ketones, glycol ethers, glycol ether acetates, or aliphatic or alicyclic hydrocarbons.

* * * * *